(12) United States Patent
Katinas et al.

(10) Patent No.: US 6,276,762 B1
(45) Date of Patent: Aug. 21, 2001

(54) CONTROL ROUTINE FOR A HYDRAULIC SYSTEM PUMP MOTOR

(75) Inventors: Dana Joseph Katinas, Farmington Hills; Kevin Austin O'Dea; Andrew A. Beach, both of Ann Arbor, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/412,623

(22) Filed: Oct. 4, 1999

(51) Int. Cl.⁷ .................................................. B60T 13/18
(52) U.S. Cl. .......................................... 303/11; 303/116.1
(58) Field of Search .......................... 303/10, 11, 115.1, 303/115.2, 115.4, 116.1, 191

(56) References Cited

U.S. PATENT DOCUMENTS

| | | | |
|---|---|---|---|
| 5,021,957 | * | 6/1991 | Yoshino et al. ............... 364/426.01 |
| 5,116,109 | * | 5/1992 | Kuwana et al. ..................... 303/109 |
| 5,190,360 | | 3/1993 | Sano . |
| 5,388,894 | * | 2/1995 | Holland et al. ....................... 303/10 |
| 5,487,593 | * | 1/1996 | Potts et al. ............................ 303/11 |
| 5,522,650 | * | 6/1996 | Negrin et al. ......................... 303/10 |
| 5,540,486 | | 7/1996 | Linkner . |
| 5,839,349 | | 11/1998 | Volz . |
| 5,921,636 | | 7/1999 | Roberts . |
| 6,027,182 | * | 2/2000 | Nakanishi et al. ................ 303/116.1 |
| 6,095,620 | * | 8/2000 | Dillard et al. ......................... 303/11 |
| 6,126,249 | * | 10/2000 | Kohl .................................. 303/116.1 |

* cited by examiner

Primary Examiner—Robert J. Oberleitner
Assistant Examiner—Bradley King
(74) Attorney, Agent, or Firm—Robert M. Sigler

(57) ABSTRACT

Improved control for a hydraulic system pump motor useful in automotive braking applications, particularly in motor-based ABS, includes a routine for controlling a pump motor so that it is operated in a manner that is not disturbing to automotive vehicle occupants. In particular, the control routine of the present invention controls pump motor operation after an ABS braking event so that the motor is running only when the motor noise is masked by the pulsing of the ABS solenoids or after driver braking pressure is released from the master cylinder. In this way, the amount of objectionable noise transmitted to the automotive vehicle occupants is reduced, while important ABS pump functions, such as the draining of the accumulators following an ABS braking event, are facilitated.

2 Claims, 2 Drawing Sheets

CONTROL ROUTINE FOR A HYDRAULIC SYSTEM PUMP MOTOR

TECHNICAL FIELD

The present invention relates to hydraulic systems, and more particularly, to control routines for the operation of pump motors for use in vehicle braking systems.

BACKGROUND

Hydraulic circuits form the basis for most vehicle braking systems, especially automotive vehicle braking systems. Hydraulic power is particularly suited to such braking systems since it converts fluid pressure into mechanical motion and allows the source of the hydraulic pressure to be positioned remotely from the cylinders which effect the braking action. Such automotive braking systems are generally hydraulic throughout, consisting of an actuator, such as a brake pedal, a reservoir of fluid such as a master cylinder, whose pressure is responsive to pressure applied by the actuator, and means for converting the hydraulic pressure to braking force, such as brake cylinders. In standard systems of this type, braking pressure is achieved mechanically, utilizing the force of the depression of the brake pedal by the driver (usually accompanied by a vacuum boost) to increase the fluid pressure in the master cylinder, which is then transmitted through fluid lines to the cylinders which operate calipers or shoes, thereby forcing the calipers or shoes against the rotors or drums, respectively, to effect braking action.

Antilock braking systems ("ABS") are frequently incorporated into vehicle hydraulic braking systems, such as the aforementioned system, in order to prevent vehicle skidding during "panic" braking events or on wet or snow-covered pavement. Vehicle skidding is undesirable in that the vehicle stopping distance can be lengthened and vehicle control is reduced. In a typical ABS, a wheel speed sensor senses when individual wheels on a vehicle begin to "lock-up" (i.e., cease rotation) during braking, which is an indication that those vehicle wheels are skidding. Accordingly, in order to minimize such skidding, the ABS modulates hydraulic fluid flow to the locked wheel brake cylinder, thereby causing the brake to cycle between apply and release modes. The modulation of hydraulic fluid flow to a locking wheel brake prevents wheel lock-up while continuing to apply braking pressure, thereby allowing the driver of the associated vehicle to stop the vehicle in a safer, more controlled manner.

The modulation of fluid flow to the wheel brake cylinders can be accomplished in a variety of ways, but in standard motor-based ABS's, the hydraulic fluid modulation is effected by the controlled manipulation of ABS apply and release valves upstream of the brake cylinder with the assistance of hydraulic fluid pumps. The apply and release valves are positioned in a bypass loop and are operated such that when an ABS braking event is detected at one of the wheels, pressure initially is bled from the wheels back to the master cylinder until wheel lock-up is overcome. Then, as additional braking force is needed, the apply and release valves "pulse," thereby providing braking force to the wheel as desired while preventing wheel lock-up and undesirable skidding. Accordingly, in this manner hydraulic fluid pressure is modulated until the vehicle reaches an acceptably safe speed, such as 5 kph. At this time, in order to return braking control to the driver, the ABS release valves are closed and the apply valves are pulsed, thereby gradually restoring full master cylinder output to the wheel brakes.

The above-mentioned pumps are used in the ABS to return hydraulic fluid to the master cylinder during the ABS event. However, since the pumps are working against constant pressure being applied by the driver during the ABS event, the pumps usually cannot return the fluid to the master cylinder as quickly as the fluid is being delivered to the pumps. Accordingly, overflow reservoirs, such as hydraulic accumulators, are positioned between the vehicle wheels and the pumps to collect excess fluid that is delivered to the pumps during the ABS event. The collection of the fluid prevents back pressure that would defeat the ABS operation from being transmitted to the wheel. Then, as the pumps are able to catch up, fluid is evacuated from the accumulators and pumped back to the master cylinder. This clearing of the accumulators is important to prepare the ABS for the next ABS braking event.

Traditionally, the accumulator clearing routine, known as pump "run on," has been accomplished simultaneously with the pulsing of the ABS apply valves returning driver master cylinder brake control, thereby masking some of the pump motor noise. However, since the accumulator clearing routine generally requires up to 700 ms or more of pump motor run time to ensure adequate draining of the accumulators, and ABS apply valve pulsing typically takes only 300 ms, the pump motor noise is not masked during the last 400 ms or so of the pump motor run time. Thus the running of the pump motor after the end of the ABS apply valve pulse routine is not masked. This unmasked noise is considered undesirable because it can be loud and disturbing to vehicle occupants. The noise is particularly objectionable during low coefficient of friction stops when there is very little road noise to cover the ABS pump motor operating noise.

Furthermore, since the pump motors are typically being actuated while the vehicle is decelerating after the 5 kph "safe" speed has been reached, the driver is usually still applying pressure to the brake pedal, thereby building up significant pressure in the master cylinder. This pressure further exacerbates the noise problem in that the load on the ABS pump motor is increased, adding significantly to the noise created by the motor as well as increasing the time required to clear the accumulators fully. Additionally, operating the motor for the pumps against the high pressure is detrimental to the life of the motor.

Thus, given the disadvantages of prior art ABS pump motor control routines, there is a need for a control routine for ABS pump motors that reduces the amount of objectionable noise experienced by the occupants of an automotive vehicle when the pump motor is in operation, that lessens the stress placed on the pump motor and that satisfactorily clears a hydraulic reservoir, such as an accumulator, of stored fluid.

SUMMARY OF THE INVENTION

The present invention is an improved control routine particularly useful for lessening the noise caused by end-of-stop ABS pump motor "run on." Additionally, the improved control routine of the present invention is useful for increasing the useful life of ABS pump motors by decreasing the stress placed on the motors.

The control routine of the present invention is useful for controlling ABS pump motors during the clearing of hydraulic accumulators in motor-based ABS braking systems following ABS braking events. In particular, the control routine operates the ABS pump motor to clear the accumulators at the end of an ABS stop only when the pump motor noise is masked by the pulsing of the ABS apply valves returning driver control after the ABS event, or after pressure to the master cylinder is reduced.

Previously, accumulator clearing has been accomplished by utilizing a control routine that runs the pump motor the entire time necessary to clear the accumulator immediately following the ABS braking event. The beginning of this pump motor routine at the end of the ABS braking event coincides with the ABS apply valve pulse routine returning driver master cylinder control. However, since the apply valve pulse routine is a relatively quick operation, generally lasting only 300 ms, and the pump motor run time required to clear the accumulator is generally much greater, on the order of 700 ms, the pump motor runs "unmasked" by the apply valve solenoid pulse routine for 400 ms.

Additionally, the ABS pump motor operating against a pressurized master cylinder when the apply valve pulse routine is run makes the pump motor noise particularly loud. Therefore, in order to mask the unpleasant sound experienced by the occupants of the vehicle, the control routine of the present invention turns the pump motor off simultaneously with the end of the apply valve pulse routine. The pump motor is not re-actuated to finish clearing the accumulators until the vehicle reaches a speed whereby the lack of master cylinder pressure is sufficient to allow the pump motor to operate quietly.

Accordingly, it is an object of the invention to provide a control routine for a hydraulic system, particularly useful for operating a pump motor in a motor-based ABS braking system, that prevents the unmasked transmission of ABS pump motor "run on" noise to vehicle occupants; a control routine that allows a pump motor to operate relatively quietly; a control routine that clears residual hydraulic fluid from the accumulators in a motor-based ABS system following an ABS braking event; a control routine that reduces the stress on the ABS pump motor; and a control routine that is relatively simple to implement and does not impair vehicle braking.

Other objects and advantages of the present invention will be apparent from the following description, the accompanying drawings, and the appended claims.

DESCRIPTION OF THE PREFERRED EMBODIMENT

Figure 1:
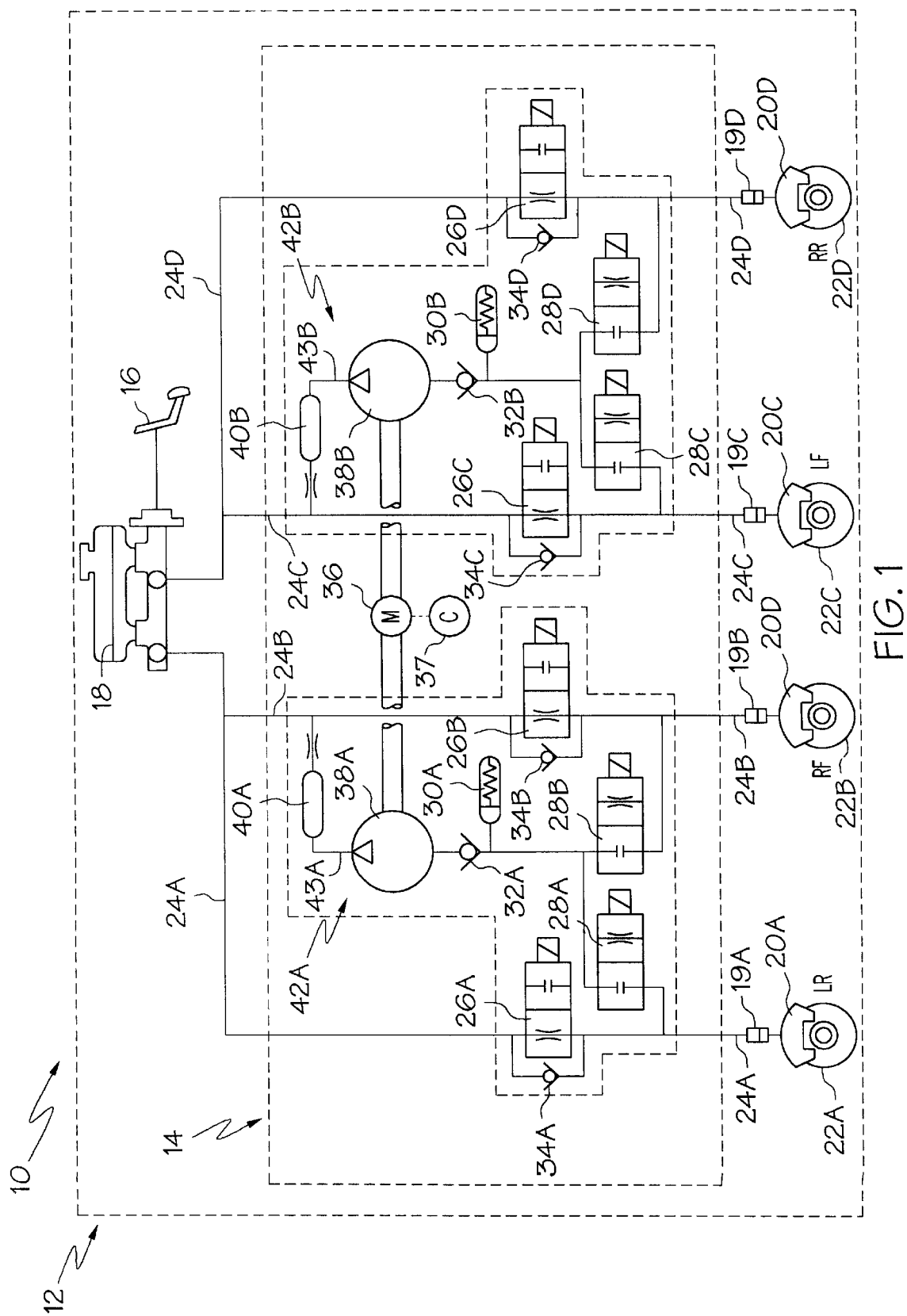
FIG. 1 is a schematic of a hydraulic braking system in which a preferred embodiment of the control routine of the present invention is utilized.

As shown in FIG. 1, in a preferred embodiment, the control routine for a hydraulic system pump motor of the present invention is used in a typical vehicle hydraulic braking system, generally designated 10. The hydraulic braking system 10 consists of two main systems: the standard braking system, generally designated 12, and the anti-lock braking system ("ABS"), generally designated 14. The standard braking system 12 includes a driver-controlled actuator, such as a brake pedal 16, a reservoir of fluid responsive to pressure applied by the brake pedal 16, such as a master cylinder 18, means for converting the hydraulic pressure to the braking force, such as cylinders 19A, 19B, 19C, 19D, means for applying the braking force, such as calipers 20A, 20B, 20C, 20D, and means for slowing the vehicle, such as rotors 22A, 22B, 22C and 22D. These components are arranged in a standard braking system 12 of this type such that the braking force is achieved by transmission of the force of the depression of the brake pedal 16 by the driver, usually accompanied by a vacuum boost, to increase the pressure in the master cylinder 18. The increased pressure in the master cylinder 18 is then transmitted through hydraulic fluid lines 24A, 24B, 24C, 24D to the cylinders 19A–19D which operate the calipers 20A–20D, thereby forcing the calipers 20A–20D against the rotors 22A–22D, respectively, to slow the vehicle.

As mentioned above, ABS 14 can be added to a standard system 12 to improve braking control and safety. A typical motor-based ABS 14 includes apply valves 26A, 26B, 26C 26D, release valves 28A, 28B, 28C, 28D, accumulators 30A, 30B, check valves 32A, 32B, safety check valves 34A, 34B, 34C, 34D, a pump motor 36, a controller 37, pumps 38A, 38B, and attenuators 40A, 40B. These components are configured in the ABS 14, such that the apply valves 26A–26D and release valves 28A–28D are positioned in hydraulic fluid bypass loops 42A, 42B, which the accumulators 30A, 30B, check valves 32A, 32B, pumps 38A, 38B, and attenuators 40A, 40B. The pump motor 36 is connected to drive the pumps 38A, 38B. The operation of the pump motor 36 is controlled by the controller 37 using, for example, a pump on timer that runs the pump motor 36 a predetermined length of time. In a preferred embodiment, the apply valves 26A–26D are normally-open solenoid valves and the release valves 28A–28D are normally-closed solenoid valves, although other valve configurations may be used and are within the scope of the invention.

Specifically, when vehicle wheel lock-up is detected at one of the wheels, such that, for example, rotor 22A ceases rotating, the normally-open apply valve 26A corresponding to that wheel immediately closes. Simultaneously, the corresponding normally-closed release valve 28A is opened and the pump motor 36 is actuated by the controller 37 to operate the corresponding pump 38A. In this way, hydraulic pressure in the fluid line 24A is released and bled from the cylinder 19A of locked rotor 22A back through line 24A to the master cylinder 18 until wheel lock-up is overcome. Then, as additional braking force is needed, the apply valve 26A and release valve 28A are pulsed, thereby providing braking force to the wheel as desired while preventing wheel lock-up and resultant undesirable skidding. Accordingly, in this manner hydraulic fluid pressure is modulated during the ABS event until the vehicle reaches an acceptably safe speed, such as 5 kph. At this time, in order to return braking control to the driver, the ABS release valve 28A is closed and the corresponding apply valve 26A is pulsed, thereby gradually restoring full master cylinder 18 output to the associated caliper 20A.

Despite the fact that the pumps 38A, 38B are actuated by the controller 37 as soon as the ABS braking event is detected to return hydraulic fluid to the master cylinder 18, the pumps 38A, 38B usually cannot return the fluid to the master cylinder 18 as quickly as the fluid is being delivered to the pumps 38A, 38B. This is because the pumps 38A, 38B are working against the continual and significant pressure being applied by the driver to the brake pedal 16 during the ABS event requesting braking force. Accordingly, overflow reservoirs, also known as hydraulic accumulators 30A, 30B, are positioned on lines 43A, 43B between the cylinders 19A–19D and the pumps 38A, 38B to collect excess fluid that is delivered to the pumps 38A, 38B during an ABS braking event. The collection of fluid in the accumulators 30A, 30B prevents back pressure that would circumvent the ABS operation from being transmitted to the cylinders 19A–19D. The excess hydraulic fluid is then drained from the accumulators 30A, 30B to the master cylinder 18 through lines 43A, 43B and lines 24B, 24C and 24A, 24D as soon as the pumps 38A, 38B are able to catch up. In most instances, though, the pumps 38A, 38B do not catch up with the fluid flow to the pumps during the ABS braking event due to the volume of hydraulic fluid being forced through the lines 24A–24D to the cylinders 19A–19D during this time. Thus the pumps 38A, 38B are typically run for a set period of time following the ABS braking event to ensure thorough clearing of the accumulators 30A, 30B. In a preferred embodiment, the running of the pump motor 36 during the clearing of the accumulators 30A, 30B is controlled by a pump on timer through the controller 37.

Traditionally, this accumulator clearing routine, known as pump "run on," has been accomplished simultaneously with the pulsing of the ABS apply valves 26A–26D returning driver master cylinder brake control, thereby masking some of the pump "run on" noise. However, since the accumulator clearing routine generally requires up to 700 ms or more of pump motor run time to ensure adequate draining of the accumulators 30, and ABS apply valves 26A–26D pulsing typically takes only 300 ms to return full driver master cylinder control, the pump motor 36 noise is not masked during the last 400 ms or so of the pump motor 36 run time.

Accordingly, the control routine of the present invention operates the pump motor 36 to clear the accumulators 30A, 30B only during the time period while the apply valves 26 are pulsing to return driver master cylinder 18 control to the brakes. In a preferred embodiment, this time is approximately 300 ms, although, depending on other conditions, such as the specific hydraulic system, length of braking time, size of braking system, etc., this time could be longer or shorter. Then, after receiving indication from the brake switch (not shown) that driver brake pedal 16 pressure has been relieved, the pump motor 36 is actuated by the controller 37 for a set period of time sufficient to ensure adequate clearing of the accumulators 30A, 30B. While this additional pump motor 36 run time may vary depending on the hydraulic system, pump capacity, etc., in a preferred embodiment the time required is approximately 300 ms. The running of the pump motor 36 at this time is significantly quieter than during vehicle deceleration following the ABS braking event because pump motor 36 load is very low due to the lack of pressure from the master cylinder 18.

Additionally, it should be noted that the necessary total pump motor 36 run time necessary to ensure clearing of the accumulators 30 is decreased using the control routine of the present invention. It is believed that the decrease in necessary pump motor run time can be attributed to the additional volume of fluid that is moved during the pump motor 36 "spin-up" and "spin-down" as well as the pump motor 36 running against decreased pressure from the master cylinder 18. Accordingly, using the improved control routine of the present invention, pump motor 36 life is increased since the pump motor 36 is run a shorter period of time and less load is placed on the motor 36 during the accumulator clearing routine.

Figure 2:
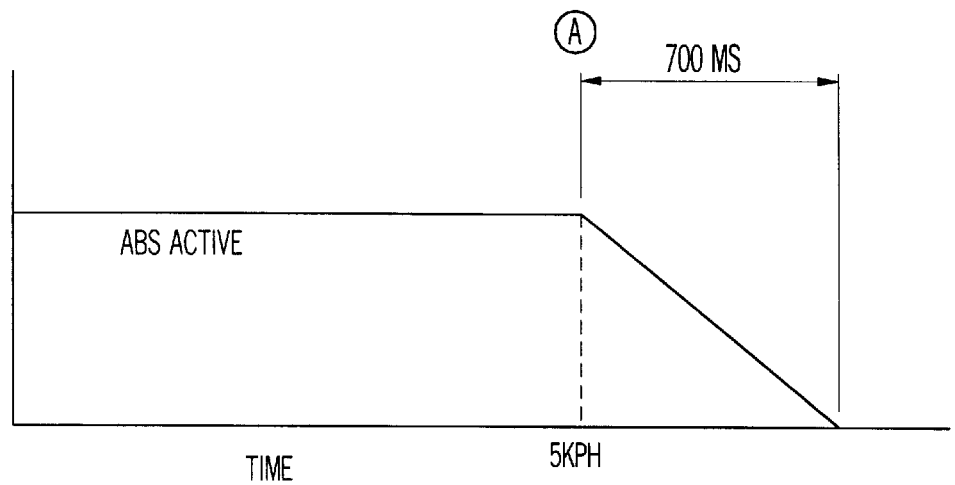
FIG. 2 is a graph of the ABS pump motor on timer versus actual time during an ABS braking event utilizing a prior art control routine for a hydraulic system.
Figure 3:
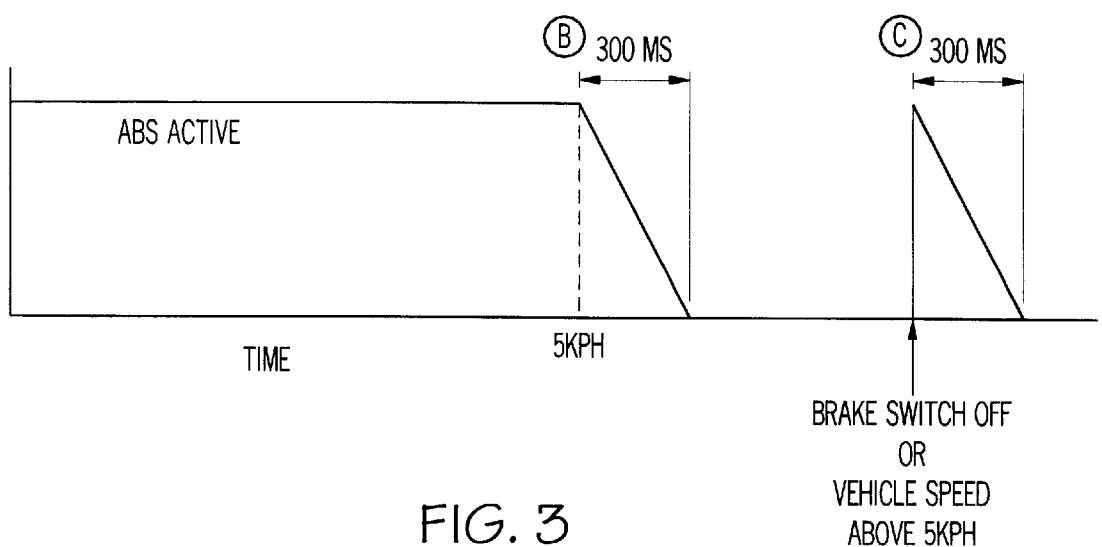
FIG. 3 is a graph of the ABS pump motor on timer versus actual time during an ABS braking event utilizing a preferred embodiment of the control routine of the present invention.

The control routine of the present invention can better be understood by reference to FIGS. 2 and 3, which are graphs of the pump on timer versus time during and after an ABS braking event. As mentioned above, the pump on timer is a timer that controls the length of pump motor "run on" necessary to clear the accumulators 30A, 30B following an ABS braking event, and the utilization of the pump on timer is one example of how the control routine of the present invention may be implemented through the controller 37. It should be understood that the use of the pump on timer to implement the control routine of the present invention is merely illustrative of one preferred embodiment of the invention. The control routine of the present invention may be implemented in a variety of other ways, including, for example, by the utilization of a stepper motor or by the addition of a liquid level indicator to the accumulators 30A, 30B. Accordingly, the use of the pump on timer to implement the present invention should not be seen as limiting the invention to the particular embodiment described herein.

As can be seen from FIG. 2, in a prior art pump control routine, as soon as the vehicle reaches a "safe" speed of 5 kph (point A) indicating the end of the ABS braking event, the pump on timer runs for the entire time (in this case, 700 ms) required to ensure adequate clearing of the accumulators 30A, 30B (FIG. 1). Then, upon expiration of the timer, the pump motor 36 is stopped. As mentioned previously, this extra pump motor run time (in this case, 400 ms) after the completion of the apply valve pulsing routine creates undesirable noise and motor wear due to the master cylinder 18 pressure being applied at that time.

In the present invention, as best shown in FIG. 3, the pump on timer runs the motor for the same amount (or less) of time as the apply valve pulsing routine following the vehicle reaching a "safe" speed (in this case, 300 ms) as shown at point B. Then, after master cylinder 18 (FIG. 1) pressure is determined to be released, either by the vehicle brake switch indication of no driver brake pressure or the vehicle regaining a speed of greater than 5 kph, the pump on timer runs the pump motor 36 for a period of time sufficient to clear the accumulators 30A, 30B (in this case, 300 ms) as shown at point C. As discussed above, it is believed that total pump motor 36 run time necessary to clear the accumulators 30A, 30B is decreased (in this case from 700 ms to 600 ms) due to the additional motor "spin-up" and "spin-down" provided by the control routine of the present invention, as well as the pump motor 36 having to work against less master cylinder 18 pressure.

While the form of the apparatus herein described constitutes a preferred embodiment of the invention, it is to be understood that the invention is not limited to this precise form of apparatus, and that changes may be made therein without departing from the scope of the invention.

What is claimed is:

1. In a hydraulic braking system having a brake pedal operatively connected to a master cylinder that is in fluid communication with a brake cylinder which operates a vehicle brake, a hydraulic bypass loop operatively coupled between said master cylinder and said brake cylinder for allowing hydraulic fluid flow from said brake cylinder back to said master cylinder, said bypass loop further including a valve array for controlling fluid flow from said brake cylinder back through said bypass loop to said master cylinder, a pump for assisting in returning said fluid back to said master cylinder, a motor for operating said pump, and an accumulator for collecting excess fluid delivered to said pump; a control routine for controlling said pump motor comprising the steps of:

increasing a pressure level in said hydraulic system using said brake pedal;

sensing that said pressure level in said system is sufficient to cause vehicle wheel lock-up;

operating said valve array in response to said vehicle wheel lock-up to reduce hydraulic pressure at the vehicle brake relative to said master cylinder, thereby bleeding hydraulic fluid from said brake cylinder to said accumulator;

pulsing said valve array until an associated vehicle has decelerated to a first predetermined speed;

continuing to pulse said valve array and actuating said pump motor for a first time interval sufficient to reestablish hydraulic pressure at the wheel brake equal to that in said master cylinder;

ceasing operation of said pump motor upon the end of said first time interval; and re-starting operation of said pump motor for a second time interval sufficient to clear said accumulator upon identification of decreased master cylinder pressure or vehicle speed exceeding a second predetermined speed greater than or equal to said first predetermined speed.

2. The control routine of claim 1 wherein the identification of decreased master cylinder pressure, in the step of re-starting operation of said pump motor, is performed by sensing operator deactivation of said bake pedal.

* * * * *